United States Patent [19]
Yoshida et al.

[11] Patent Number: 5,306,678
[45] Date of Patent: Apr. 26, 1994

[54] DISC BRAKE FOR VEHICLES

[75] Inventors: Hiroshi Yoshida; Kenichi Yamazaki; Morio Yumoto, all of Nagano, Japan

[73] Assignee: Nissin Kogyo Co., Ltd., Ueda, Japan

[21] Appl. No.: 885,537

[22] Filed: May 19, 1992

[30] Foreign Application Priority Data

May 21, 1991 [JP] Japan ................................. 3-116154

[51] Int. Cl.⁵ ............................................. C04B 35/02
[52] U.S. Cl. .................................. 501/95; 188/251 A
[58] Field of Search .................. 501/87, 95, 128, 153; 264/29; 523/155; 428/224; 188/251 A, 251 R, 218 R, 218 XL

[56] References Cited

U.S. PATENT DOCUMENTS

| | | | |
|---|---|---|---|
| 2,784,105 | 3/1957 | Stedmael et al. | 188/251 A |
| 3,895,084 | 7/1975 | Bauer | 264/29 |
| 4,051,097 | 9/1977 | Aldrich | 260/38 |
| 4,576,836 | 3/1986 | Colmet et al. | 427/255 |
| 4,610,917 | 9/1956 | Yamamura et al. | 428/224 |
| 4,735,975 | 4/1988 | Iwata et al. | 523/152 |
| 4,743,635 | 5/1988 | Nakagawa et al. | 523/155 |
| 4,775,705 | 10/1988 | Parker et al. | 523/153 |
| 4,792,361 | 12/1988 | Double et al. | 106/97 |
| 4,866,107 | 9/1989 | Doxsee et al. | 523/153 |
| 4,926,978 | 5/1990 | Shibata et al. | 188/73.1 |
| 5,041,471 | 8/1991 | Brinzey | 523/153 |
| 5,049,329 | 9/1991 | Allaire et al. | 264/60 |
| 5,077,243 | 12/1991 | Nakano et al. | 501/95 |
| 5,122,550 | 6/1992 | Schmitt | 523/149 |

*Primary Examiner*—Mark L. Bell
*Assistant Examiner*—A. Wright
*Attorney, Agent, or Firm*—Armstrong, Westerman, Hattori, McLeland & Naughton

[57] ABSTRACT

A disc brake vehicles according to this invention is directed to enhancing the coefficient of friction and wear resistance in the friction members, and to reducing the size and weight of the disc brake, in turn, the unspring weight so as to improve operation stability in driving a vehicle. In the disc brake according to the constitution of this invention, either the disc or the brake pads are made of a carbon fiber reinforced ceramic composite consisting of a ceramic matrix reinforced by a carbon fiber.

7 Claims, 1 Drawing Sheet

DISC BRAKE FOR VEHICLES

FIELD OF THE INVENTION

This invention relates to a disc brake for vehicles, including a disc adapted to rotate integrally with the wheels and brake pads which are brought into friction contact with each face of the disc.

DISCLOSURE OF THE PRIOR ART

In general, as the friction members of disc brakes for vehicles, there have been used a cast iron disc and brake pads made of the so-called resin mold material, such as semi-metallic materials and non-asbestos.

However, the maximum coefficient of friction which can be attained by the combination of the above types of disc and brake pads is 0.3 to $0.4\mu$ (according to JIS D4411), and such combination of disc and brake pads wear away soon. The wear of brake pads is increased, particularly when brake pads made of a soft material are used so as to improve brake feeling and increase the coefficient of friction.

SUMMARY OF THE INVENTION

It is an object of this invention to provide a disc brake for vehicles using a combination of a disc and brake pads which can yield a high coefficient of friction with reduced wear rates.

The disc brake for vehicles according to this invention is characterized in that either the disc adapted to rotate integrally with the wheels or the brake pads which are brought into friction contact with each face of the disc are made of a carbon fiber reinforced ceramic composite, i.e. a ceramic matrix reinforced by a carbon fiber.

The carbon fiber reinforced ceramic composite of the above-described composition has a high hardness, and is excellent in toughness and crack resistance, making it possible to provide a disc brake having friction members which can give a high coefficient of friction stably even under temperature-changing conditions with reduced wear rates.

Further, since the friction members can give a high coefficient of friction and wear at low rates, it is possible to reduce the size and weight of a caliper by reducing the weight of the disc and brake pad, and in turn the unspring weight to thereby improve operation stability in driving the vehicle.

DESCRIPTION OF THE PREFERRED EMBODIMENT

Figure 1:
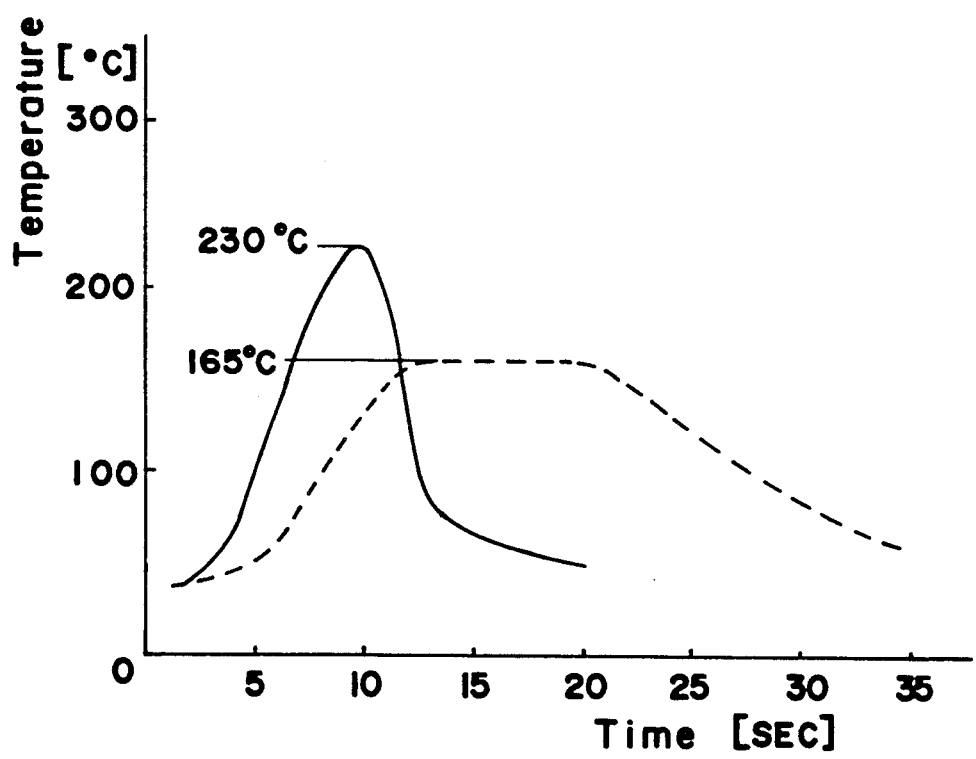
FIG. 1 is a graph showing changes in the temperature of the discs, used in Experiment 1, caused by the frictional heat generated by a braking operation.

This invention will now be described in detail by way of a preferred embodiment.

The carbon fiber reinforced ceramic composite to be used according to this invention is prepared in the following manner: Mullite is admixed with to a solution of organometallic high polymer to form a slurry impregnating solution, and long carbon fibers are immersed therein so as to deposit the solution uniformly on the surface of the fiber. The thus impregnated long fiber is cut into a desired length, and layered one after another, each time changing the orientation of the fiber until the resulting laminate has a predetermined thickness. The laminate is then heated under an inert gas atmosphere to make the organometallic high polymer infusible, and then shaped to a die, followed by baking under pressure by a hot press under an inert gas atmosphere.

Thus, the organic component of the organometallic high polymer is pyrolytically decomposed and released therefrom in the form of fine particles of carbide or nitride which is uniformly dispersed throughout the mullite grain boundary, whereby a carbon fiber reinforced ceramic composite is further reinforced by the particles dispersed therein.

The thus obtained composite, in which fine particles and long fibers are uniformly dispersed in the matrix, has a markedly improved fracture toughness, since upon exposure of the composite to a breaking force applied from outside, crack deflection and pull-out of fibers from the matrix simultaneously take place to effectively absorb a considerable amount of fracture energy.

Further, the ceramics have high hardness and are excellent in thermal shock resistance, heat resistance and wear resistance. Therefore, the above-described ceramic composite is a material which can effectively be used for a braking device which operates based on the principle of converting kinetic energy into thermal energy.

Experiment 1

The above-described carbon fiber reinforced ceramic composite was used as the disc, while S45C steel, a type of carbon steels for machine structural use, was used as the brake pad.

The present invention tested this combination of disc and brake pads according to JIS D4411. The results are as follows:

(1) The coefficient of friction achieved by this combination was 0.5 to $0.6\mu$, and stable to change in temperature.

(2) As can be understood from FIG. 1 which shows change in the temperature of the present discs (solid line) caused by frictional heat generated by the braking operation in comparison with that of a conventional disc made of cast iron (broken line), the present disc was much more excellent in heat-up properties, heat dissipation properties, and efficiency of converting kinetic energy into thermal energy than the conventional disc. Therefore, energy to be consumed for wearing of the disc can be reduced according to this invention, which results in an improved wear resistance.

(3) The depth of wear of the present disc was not more than 5 microns in comparison with 20 to 30 microns of the conventional cast iron disc.

(4) The depth of wear of the present brake pads was 0.2 mm to 0.3 mm in comparison with 0.5 mm to 1 mm of the conventional resin mold brake pads.

(5) The carbon fiber reinforced ceramic composite is excellent in toughness, crack resistance, and thermal dissipation properties, and at the same time has a high wear resistance. Therefore, the present disc may sufficiently have a thickness of one fourth or less of that of a conventional ventillated type disc made of cast iron or one half of that of a conventional solid type disc. Therefore, the weight of the disc was reduced to about 1.6 kg in comparison with about 5 kg of the one made of cast iron.

(6) The present disc may sufficiently have a thickness of about two thirds of that of the conventional ones, since the present disc has a smaller wear rate.

(7) The present disc brake exhibited excellent antifading properties, since both the disc and the brake pads are respectively of highly heat-resistant materials. Further, since the disc also has excellent thermal dissipation properties, the frictional heat generated by the braking operation is efficiently dissipated, which enables one to obtain a stable braking force even during braking operation under high heat load.

In addition, when the same test as above was carried out using the present disc in combination with brake pads made of rolled steel for general structural use, a sintered metallic material and a resin mold material, respectively, substantially the same results as described above were obtained.

As can be understood from the above, the thickness of the disc and those of the brake pads can be reduced according to this invention over the conventional ones, and thus the width of the bridge of a caliper can be reduced. Accordingly, not only the size and weight of the caliper can be reduced, but also the rigidity thereof can be increased, and this, in turn, coupled with the reduced weight of the disc, contributes to the reduction of the unsprung weight, improving operation stability in driving a vehicle.

Experiment 2

The carbon fiber reinforced ceramic composite was used as the brake pad, while S45C steel, a type of carbon steels for machine structural use, was used as the disc.

This disc and brake pad combination was tested in the same manner as in Experiment 1 (JIS D4411).

(1) The coefficient of friction achieved by the combination was 0.7 to 0.9μ, and stable to changes in temperature.

(2) The depth of wear of the present brake pad was 0.1 mm to 0.2 mm in comparison with 0.5 mm to 1 mm of the conventional resin mold brake pads.

(3) The depth of wear of the present disc was not more than 10 microns in comparison with 20 to 30 microns of the conventional cast iron discs.

(4) The thickness of the present brake pad may sufficiently be about two thirds of that of the conventional ones, since the present brake pad has a smaller wear rate.

In addition, when the same test as above was carried out using the present brake pad in combination with a cast iron disc and stainless steel disc, respectively, substantially the same results as described above were obtained.

As can be understood from the above, the thickness of the brake pad can be reduced according to this embodiment over the conventional ones, and thus not only the size and weight of a caliper can be reduced, but also the rigidity thereof can be increased. Further, since a high coefficient of friction can be achieved between the disc and the brake pad according to this invention, it is possible to reduce the diameter of the disc as well as the surface area of the brake pad to be brought into friction contac with the disc, whereby the size of the brake pad, and in turn the size of the caliper, can be reduced to improve operation stability in driving a vehicle.

What is claimed is:

1. A disc brake for a vehicle comprising a disc having at least two faces and adapted to rotate integrally with a wheel of the vehicle, a brake pad movable into friction contact with each face of said disc, and means for moving said brake pad into contact with said disc, wherein one of said disc or said brake pads are made of a carbon fiber reinforced ceramic composite consisting of a ceramic matrix containing mullite having a grain boundary and particles of carbide or nitride dispersed in the grain boundary, said matrix reinforced by a carbon fiber, the other of said disc or said brake pads is made of a different material.

2. A disc brake for a vehicle according to claim 1, wherein said carbon fiber reinforced ceramic composite is prepared by:

preparing a slurry impregnation solution prepared by admixing mullite into a solution of an organometallic high polymer;

immersing a long carbon fiber into said slurry impregnation solution so as to allow said impregnating solution to uniformly deposit onto each surface of said long carbon fiber;

cutting the thus impregnated long carbon fiber to produce cut pieces of long carbon fiber;

layering the cut pieces of long carbon fiber one after another, each adjacent layer having a changed orientation of said long carbon fiber pieces, so as to produce a laminate of said long carbon fiber pieces having a thickness;

heating the laminate under an inert gas atmosphere to make said organometallic high polymer infusible;

shaping the laminate in a die to produce a shaped laminate; and baking the shaped laminate under pressure in a hot press under an inert gas atmosphere.

3. A disc brake for a vehicle according to claim 1, wherein the different material is a steel containing material.

4. A disc brake for a vehicle according to claim 3, wherein the steel containing material is stainless steel.

5. A disc brake for a vehicle according to claim 3, wherein the steel containing material is S45C steel.

6. A disc brake for a vehicle according to claim 1, wherein the different material is an iron containing material.

7. A disc brake for a vehicle according to claim 6, wherein the iron containing material is cast iron.

* * * * *